United States Patent
Nakamura et al.

(10) Patent No.: US 11,410,827 B2
(45) Date of Patent: Aug. 9, 2022

(54) FUSE HAVING FREQUENCY SEPARATION FUNCTION

(71) Applicant: NIPPON TELEGRAPH AND TELEPHONE CORPORATION, Tokyo (JP)

(72) Inventors: Naomichi Nakamura, Musashino (JP); Hidetoshi Takada, Musashino (JP); Jun Kato, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 2 days.

(21) Appl. No.: 17/044,961

(22) PCT Filed: Apr. 3, 2019

(86) PCT No.: PCT/JP2019/014719
§ 371 (c)(1),
(2) Date: Oct. 2, 2020

(87) PCT Pub. No.: WO2019/194206
PCT Pub. Date: Oct. 10, 2019

(65) Prior Publication Data
US 2021/0027968 A1    Jan. 28, 2021

(30) Foreign Application Priority Data
Apr. 4, 2018   (JP) .............................. JP2018-072391

(51) Int. Cl.
*H01H 85/143* (2006.01)
*H02H 7/00* (2006.01)
*H01H 85/02* (2006.01)

(52) U.S. Cl.
CPC ...... *H01H 85/143* (2013.01); *H01H 85/0241* (2013.01); *H02H 7/00* (2013.01)

(58) Field of Classification Search
CPC ..... H01H 85/143; H01H 85/0241; H02H 7/00
See application file for complete search history.

(56) References Cited

U.S. PATENT DOCUMENTS 5,206,779 A * 4/1993 Sato ................... H01R 13/6666
361/111
6,246,182 B1 * 6/2001 Yamasaki .............. H05B 39/00
315/209 R
(Continued)

FOREIGN PATENT DOCUMENTS

| JP | S4424013 B1 | 10/1969 |
| JP | S552270 U1 | 1/1980 |

(Continued)

*Primary Examiner* — Stephen S Sul

(57) ABSTRACT

A fuse with a frequency separation function includes an input port portion, an output port portion, a first transmitting portion between the input port portion and the output port portion, the first transmitting portion configured to transmit a lightning surge current entering the input port portion and guide the lightning surge current to the output port portion, a second transmitting portion between the input port portion and the output port portion, the second transmitting portion configured to be capable of transmitting a normal current and an abnormal current entering the input port portion, and a melting mechanism portion which is provided between the second transmitting portion and the input port portion or between the second transmitting portion and the output port portion, the melting mechanism configured not to melt and break when the normal current passes, and configured to melt and break when the abnormal current passes.

7 Claims, 5 Drawing Sheets

(56) References Cited

U.S. PATENT DOCUMENTS

| | | | |
|---|---|---|---|
| 10,170,904 B2* | 1/2019 | Peach | H02H 9/005 |
| 2010/0008008 A1* | 1/2010 | Katayama | H01T 4/08 |
| | | | 361/117 |
| 2013/0208387 A1* | 8/2013 | Nguyen | H02H 3/02 |
| | | | 361/118 |
| 2020/0253016 A1* | 8/2020 | Hung | H05B 45/10 |
| 2021/0298153 A1* | 9/2021 | Hampel | F21V 23/003 |

FOREIGN PATENT DOCUMENTS

| | | | |
|---|---|---|---|
| JP | 2016163523 A | 9/2016 |
| JP | 20193844 A | 3/2019 |

* cited by examiner

FUSE HAVING FREQUENCY SEPARATION FUNCTION

CROSS-REFERENCE TO RELATED APPLICATIONS

This application is a 371 U.S. National Phase of International Application No. PCT/JP2019/014719, filed on Apr. 3, 2019, which claims priority to Japanese Application No. 2018-072391 filed on Apr. 4, 2018. The entire disclosures of the above applications are incorporated herein by reference.

TECHNICAL FIELD

The present disclosure relates to a fuse with a frequency separation function for separating a high frequency current such as a lightning surge current that has entered a cable such as a power source line or a communication line.

BACKGROUND ART

In the related art, in order to protect electrical and electronic devices from high frequency currents such as lightning surge currents, a method of bypassing a lightning surge that has entered a cable to ground lines or other cables and protecting the devices using a surge protective device (SPD) is known (see, for example, Patent Document 1).

In addition, a method of mounting a fuse in an internal circuit of a device is known as a countermeasure against an electric shock or a burn-out accident in a case where a low frequency abnormal current (a leakage current, a ground fault current, or the like) flows through a cable due to leakage or a short circuit accident of an electrical or electronic device. According to this method, in a case where a current exceeding the amount of melting and breaking current flows, the inside of a fuse melts and breaks, and thus the entry of an abnormal current can be blocked.

In this manner, electrical or electronic devices can be used safely using an SPD or a fuse.

CITATION LIST

Patent Literature

Patent Literature 1: JP 2016-163523A

SUMMARY OF THE INVENTION

However, such a method of the related art has the following problems.

An SPD is an element that operates (conducts) when a lightning surge that is greater than a certain value has entered and that recovers (insulates) when the lightning surge has ceased, and a fuse is an element that melts and breaks and blocks a current when a current that is greater than a certain value flows.

However, a fuse may melt and break not only by an abnormal current but also by a lightning surge current. Unlike an SPD, a fuse does not recover once it has operated (melted and broken).

When a fuse has melted and broken, an electrical or electronic device including the fuse can no longer be functional in many cases. For this reason, in a region with frequent lightning in which lightning surges frequently enter electrical or electronic devices, a fuse melts and breaks each time a lightning incident occurs, and thus devices frequently become unoperational.

Here, increasing a current value for melting and breaking a fuse such that the fuse does not melt and break due to a lightning surge current can be considered. However, when a current value for melting and breaking a fuse is increased, the fuse is also less likely to melt and break from an abnormal current, which also leads to a problem that an abnormal current will enter a device.

The present disclosure is conceived in view of such circumstances, and an object of the present disclosure is to provide a fuse with a frequency separation function that does not melt and break with a lightning surge current but melts and breaks with an abnormal current.

A first aspect of the present disclosure for achieving the above-described object provides a fuse with a frequency separation function, the fuse including an input port portion which is an input terminal of a normal current that does not exceed a predetermined amount of current, an abnormal current that exceeds the predetermined amount of current, and a lightning surge current, an output port portion which is an output terminal of the normal current, the abnormal current, and the lightning surge current, a first transmitting portion provided between the input port portion and the output port portion, the first transmitting portion configured to transmit the lightning surge current that enters the input port portion and guide the lightning surge current to the output port portion, a second transmitting portion provided between the input port portion and the output port portion, the second transmitting portion configured to be capable of transmitting the normal current and the abnormal current that enter the input port portion, and a melting mechanism portion provided between the input port portion and the second transmitting portion or between the second transmitting portion and the output port portion, the melting mechanism portion configured to melt and break when the normal current passes, and configured to melt and break when the abnormal current passes.

In a second aspect of the present disclosure, according to the fuse with a frequency separation function of the first aspect, the first transmitting portion is fixed to the input port portion and the output port portion, the second transmitting portion is fixed to any one of the input port portion and the output port portion, and the melting mechanism portion is fixed to a port portion which is not fixed to the second transmitting portion, the port portion being either the input port portion or the output port portion.

In a third aspect of the present disclosure, according to the fuse with a frequency separation function of the first aspect, the first transmitting portion is brought into contact with the input port portion and the output port portion, the first transmitting portion is not fixed to at least one of the input port portion and the output port portion, the second transmitting portion is fixed to any one of the input port portion and the output port portion, and the melting mechanism portion is fixed to a port portion which is not fixed to the second transmitting portion, the port portion being either the input port portion or the output port portion.

In a fourth aspect of the present disclosure, according to the fuse with a frequency separation function of the third aspect, the first transmitting portion has a shape of a cylindrical tube extending from the input port portion to the output port portion and a thickness of the cylindrical tube is a skin depth at which a frequency band of the lightning surge current sufficiently passes, the second transmitting portion has a shape of a cylinder extending from the input port portion to the output port portion, and a diameter of the cylinder is used as a parameter for adjusting impedance of the first transmitting portion and impedance of the second transmitting portion such that the lightning surge current flows more through the first transmitting portion than the second transmitting portion and the abnormal current flows more through the second transmitting portion than the first transmitting portion.

In a fifth aspect of the present disclosure, according to the fuse with a frequency separation function of the fourth aspect, a space between the first transmitting portion and the second transmitting portion is filled with a dielectric.

In a sixth aspect of the present disclosure, according to the fuse with a frequency separation function of the third aspect, the first transmitting portion has a shape of a quadrangular tube extending from the input port portion to the output port portion and a thickness of the quadrangular tube is a skin depth at which a frequency band of the lightning surge current sufficiently passes, and the second transmitting portion has a shape of a quadrangular prism extending from the input port portion to the output port portion.

In a seventh aspect of the present disclosure, according to the fuse with a frequency separation function of the sixth aspect, one side surface of the quadrangular tube is omitted.

In an eighth aspect of the present disclosure, according to the fuse with a frequency separation function of the sixth aspect, the first transmitting portion has a shape of a sheet extending from the input port portion to the output port portion instead of the shape of the quadrangular tube, and a thickness of the sheet is a skin depth at which a frequency band of the lightning surge current sufficiently passes.

According to the present disclosure, it is possible to realize a fuse with a frequency separation function in which a path through which a lightning surge current flows and a path through which an abnormal current flows are separated from each other, and which does not melt with a lightning surge current but melts with an abnormal current.

DESCRIPTION OF EMBODIMENTS

Embodiments of the present disclosure will be described below with reference to the drawings. However, the present disclosure can be implemented in many different modes and should not be construed as being limited to the description of these embodiments.

First Embodiment

A fuse with a frequency separation function according to a first embodiment will be described.

Figure 1:
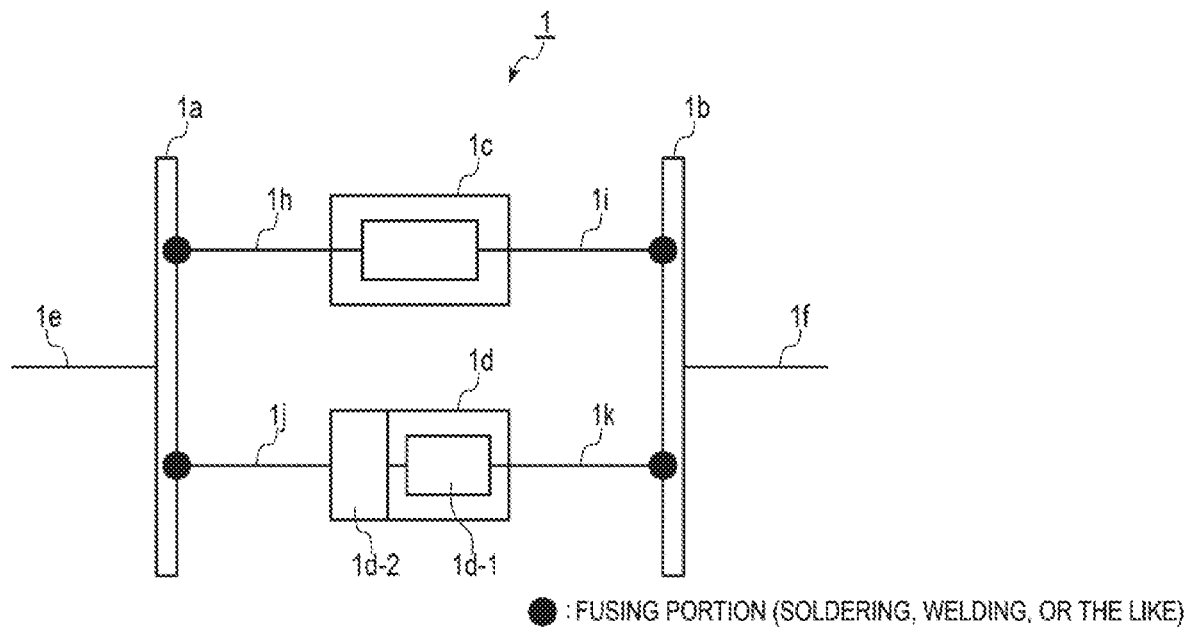
FIG. 1 is a conceptual diagram illustrating a configuration example of a fuse with a frequency separation function according to a first embodiment.

FIG. 1 is a conceptual diagram illustrating a configuration example of the fuse with a frequency separation function according to the first embodiment.

A fuse 1 with a frequency separation function includes an input port portion 1a, an output port portion 1b, a high frequency transmitting portion 1c, an abnormal current melting portion 1d, an input lead 1e, and an output lead 1f.

The input lead 1e is attached to the input port portion 1a, and an output lead 1f is attached to the output port portion 1b. The input lead 1e and the output lead 1f are respectively an input terminal and an output terminal for a high frequency lightning surge current and a normal current that does not exceed a predetermined amount of current, such as a power supply current or an electrical signal current which is a low frequency current. In addition, low frequency currents also include an abnormal current exceeding a predetermined amount of current, such as a leakage current or a ground fault current.

The high frequency transmitting portion 1c, to which a lead 1h and a lead 1i for connection to the input port portion 1a and the output port portion 1b are attached, has a function that allows a frequency band of a lightning surge current (for example, 10 kHz to 2 MHz) to pass through, and for example, a band-pass filter is preferably used.

The abnormal current melting portion 1d, to which a lead 1j and a lead 1k for connection to the input port portion 1a and the output port portion 1b are attached, includes a low frequency transmitting portion 1d-1 (for example, a low pass filter or the like), through which a low frequency band (50 Hz or 60 Hz), such as a normal current and an abnormal current, can pass and a melting mechanism portion 1d-2 (for example, a fuse element or the like) which has a function of not melting and breaking in a case where a normal current flows but melting and breaking in a case where an abnormal current flows and cutting off electrical connection between the input port portion 1a and the output port portion 1b.

In order for the high frequency transmitting portion 1c to maintain the electrical connection between the input port portion 1a and the output port portion 1b, tip ends of the lead 1h and the lead 1i are fixed (fused) to the input port portion 1a and the output port portion 1b, respectively, by soldering, welding, or the like. Similarly, in order for the abnormal current melting portion 1d to maintain electrical connection between the input port portion 1a and the output port portion 1b, tip ends of the lead 1j and the lead 1k are also fixed (fused) to the input port portion 1a and the output port portion 1b, respectively, by soldering, welding, or the like.

According to the fuse 1 with a frequency separation function according to the embodiment of the present disclosure which is configured as described above, in a case where a lightning surge current enters the input port portion 1a from the input lead 1e, the lightning surge current passes through the lead 1h, the high frequency transmitting portion 1c, and the lead 1i and reaches the output port portion 1b, and thus the melting mechanism portion 1d-2 does not melt nor break. That is, the fuse 1 with a frequency separation function does not melt nor break even when a lightning surge current enters.

Further, in a case where an abnormal current enters the input port portion 1a from the input lead 1e, the abnormal current enters the abnormal current melting portion 1d through the lead 1j. In this case, the melting mechanism portion 1d-2 melts and breaks due to the abnormal current, and thus the abnormal current is blocked without reaching the output port portion 1b.

Note that, in a case where a normal current enters the input port portion 1a from the input lead 1e, the normal current enters the abnormal current melting portion 1d through the lead 1j, but the melting mechanism portion 1d-2 does not melt nor break due to the normal current. Accordingly, the normal current passes through the low frequency transmitting portion 1d-1 and reaches the output port portion 1b through the lead 1k.

In this manner, the fuse 1 with a frequency separation function according to the present embodiment has a structure including two systems of current passage paths for different frequency bands, and thus can continuously transmit a normal current from the input port portion 1a to the output port portion 1b without melting and breaking even when a lightning surge current enters. Meanwhile, the fuse 1 with a frequency separation function according to the present embodiment includes the melting mechanism portion 1d-2, which melts and breaks in a case where the abnormal current enters, and thus can block an abnormal current.

Note that, although the melting mechanism portion 1d-2 is provided between the input port portion 1a and the low frequency transmitting portion 1d-1 in FIG. 1, the melting mechanism portion 1d-2 may be provided between the output port portion 1b and the low frequency transmitting portion 1d-1. Similar effects can be obtained with such a configuration.

Second Embodiment

A fuse with a frequency separation function according to a second embodiment will be described.

Figure 2A:
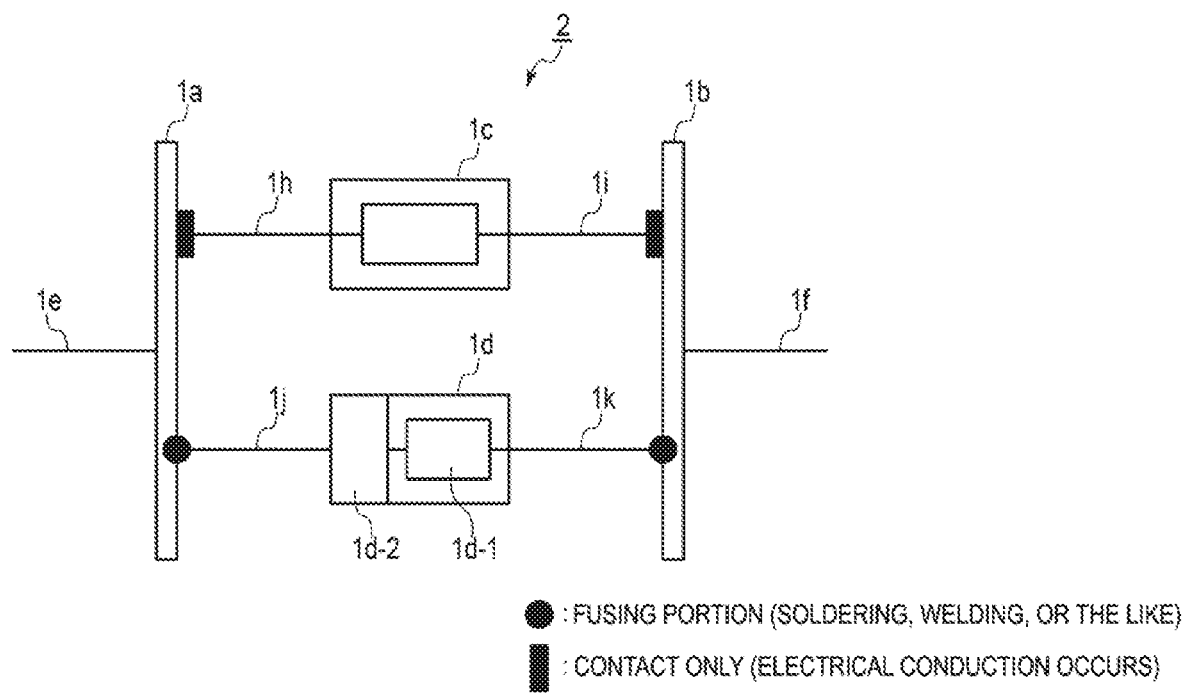
FIG. 2A is a conceptual diagram illustrating a configuration example of a fuse with a frequency separation function according to a second embodiment.

FIG. 2A is a conceptual diagram illustrating a configuration example of the fuse with a frequency separation function according to the second embodiment.

A fuse 2 with a frequency separation function according to the second embodiment is a modification example of the fuse 1 with a frequency separation function according to the first embodiment. Thus, in FIG. 2A, the same portions as those in FIG. 1 will be denoted by the same reference numerals and signs as those in FIG. 1 to avoid repeated description.

That is, the fuse 2 with a frequency separation function according to the second embodiment is different from the fuse 1 with a frequency separation function according to the first embodiment in that tip ends of the lead 1h and the lead 1i are respectively in contact with the input port portion 1a and the output port portion 1b such that the high frequency transmitting portion 1c maintains electrical connection between the input port portion 1a and the output port portion 1b, but at least one of the input port portion 1a and the output port portion 1b is not fixed (fused) to the leads 1h and 1i (by, for example, soldering, welding, or the like).

That is, although the tip ends of the lead 1h and the lead 1i of the high frequency transmitting portion 1c are in contact with the input port portion 1a and the output port portion 1b, either only the input port portion 1a and the lead 1h or only the output port portion 1b and the lead 1i are fixed. Alternatively, neither the input port portion 1a and the lead 1h nor the output port portion 1b and the lead 1i are fixed.

Note that, similarly to the first embodiment, in the abnormal current melting portion 1d, the tip end of the lead 1j is fixed (fused) to the input port portion 1a, and the tip end of the lead 1k is fixed (fused) to the output port portion 1b (by, for example, soldering, welding, or the like).

In the first embodiment, a lightning surge current flows through only the high frequency transmitting portion 1c, and an abnormal current flows through only the abnormal current melting portion 1d. However, in the second embodiment, though a lightning surge current mostly flows through the high frequency transmitting portion 1c, a portion of the lightning surge current flows through the abnormal current melting portion 1d. Though an abnormal current mostly flows through the abnormal current melting portion 1d, a portion of the abnormal current flows through the high frequency transmitting portion 1c.

In this case, when a lightning surge current occurs, a portion of the lightning surge current flows through the abnormal current melting portion 1d, while the lightning surge current mostly flows through the high frequency transmitting portion 1c, and thus the abnormal current melting portion 1d does not melt nor break.

On the other hand, when an abnormal current is generated, the abnormal current mostly flows through the abnormal current melting portion 1d, such that the melting mechanism portion 1d-2 melts and breaks as described in the first embodiment. However, when a portion of the abnormal current continuously flows through the high frequency transmitting portion 1c even after the melting mechanism portion 1d-2 has melted and broken, the abnormal current flowing between the input port portion 1a and the output port portion 1b cannot be completely blocked.

Figure 2B:
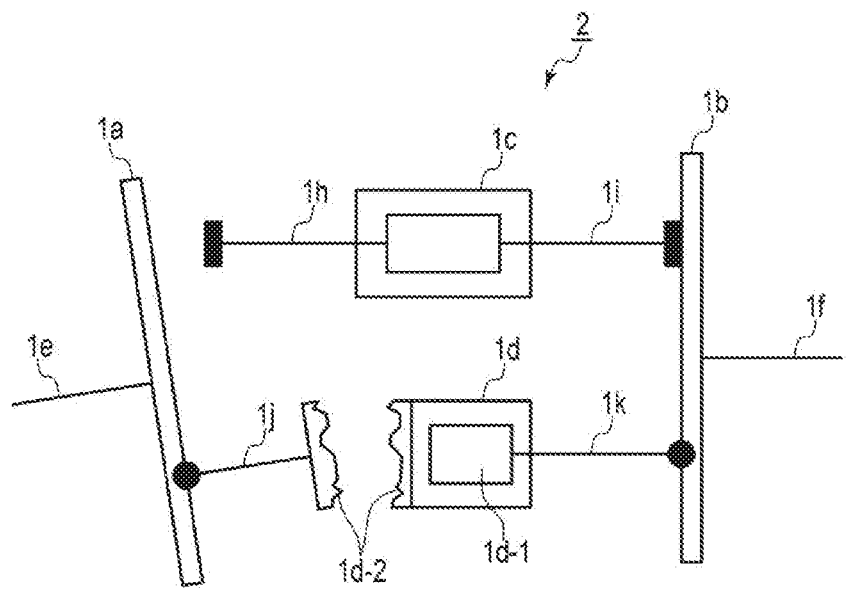
FIG. 2B is a conceptual diagram illustrating a state where a melting mechanism portion has melted and broken in the fuse with a frequency separation function according to the second embodiment.

However, according to the fuse 2 with a frequency separation function of the embodiment of the present disclosure, when an abnormal current enters from the input lead 1e and the melting mechanism portion 1d-2 melts and breaks, the abnormal current melting portion 1d is separated as illustrated in FIG. 2B. Thus the input port portion 1a and the lead 1h which are not fixed are separated from each other.

Thereby, the input port portion 1a side and the output port portion 1b side are physically separated from each other, and thus an abnormal current is blocked.

In this manner, in the fuse 2 with a frequency separation function according to the present embodiment, even when a portion of an abnormal current can pass through the high frequency transmitting portion 1c, a current can be blocked by physically separating the input port portion 1a side and the output port portion 1b side from each other in a case where an abnormal current occurs.

Third Embodiment

A fuse with a frequency separation function according to a third embodiment will be described.

Figure 3A:
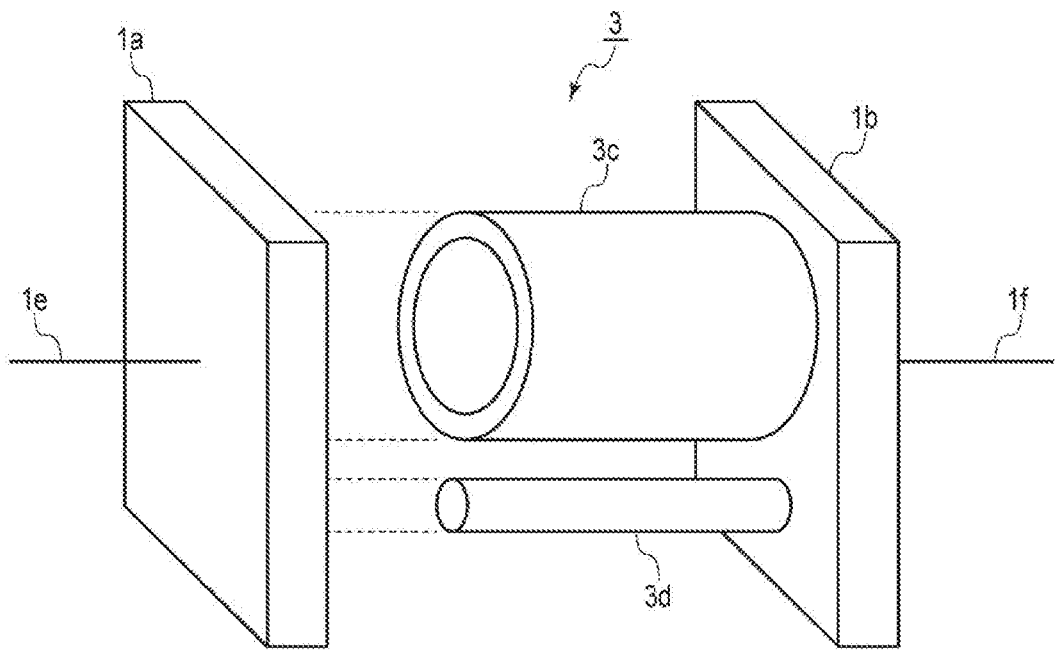
FIG. 3A is a perspective view illustrating a configuration example of a fuse with a frequency separation function according to a third embodiment.
Figure 3B:
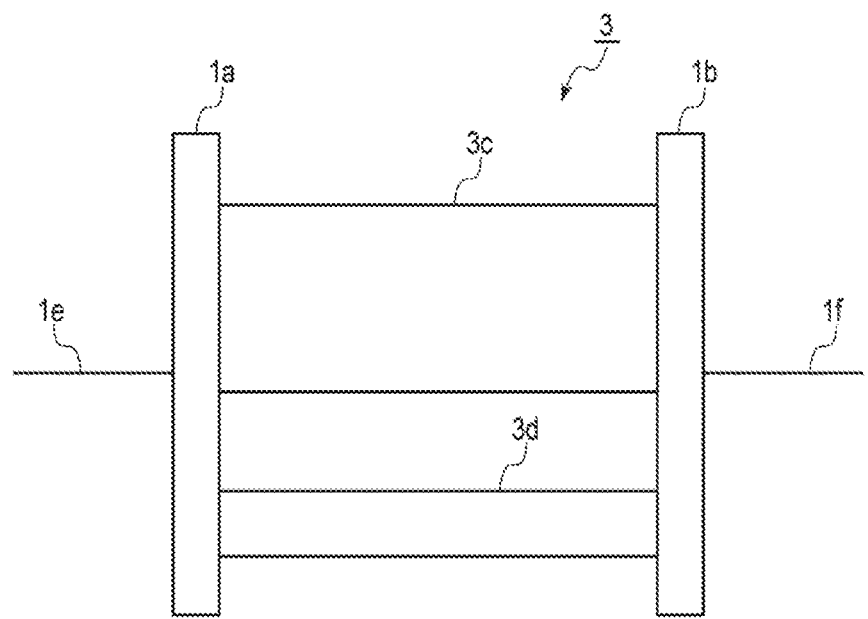
FIG. 3B is a side view corresponding to FIG. 3A.

FIG. 3A is a perspective view illustrating a configuration example of the fuse with a frequency separation function according to the third embodiment, and FIG. 3B is a side view corresponding to FIG. 3A.

In FIGS. 3A and 3B, the same portions as those in FIG. 1 are denoted by the same reference numerals and signs as those in FIG. 1 to avoid repeated description.

The fuse 3 with a frequency separation function according to the third embodiment is different from the fuse 2 with a frequency separation function according to the second embodiment in that a high frequency transmitting portion 3c and an abnormal current melting portion 3d that do not use an electrical element such as a filter are provided instead of the high frequency transmitting portion 1c and the abnormal current melting portion 1d in FIGS. 2A and 2B.

The high frequency transmitting portion 3c has a shape of a cylindrical tube extending from an input port portion 1a to an output port portion 1b and the center portion thereof is hollow. The thickness of the cylindrical tube is a skin depth at which a frequency band of a lightning surge current can sufficiently pass. The skin depth can be expressed using a principle formula of a general skin effect.

For example, when an electrical resistivity of the high frequency transmitting portion 3c is $\rho_{surge}$, an absolute permeability of the high frequency transmitting portion 1c is $\mu_{surge}$, and an angular frequency of a lightning surge current is $\omega_{surge}$, a skin depth $d_{surge}$ of the high frequency transmitting portion 1c is expressed by the following Formula (1).

[Formula 1]

$$d_{surge} = \sqrt{\frac{2\rho_{surge}}{\omega_{surge}\mu_{surge}}} \quad \text{(Formula 1)}$$

Here, the skin depth decreases as a frequency increases. An angular frequency $\omega_{surge}$ of a lightning surge current is preferably a frequency at a lower end of the frequencies at which all frequency bands of a lightning surge current can pass.

Here, the skin depth derived from Formula (1) indicates the skin depth at which the current is 1/e (approximately 0.37) of a surface current. The high frequency transmitting portion 3c is a conductor through which a current passes, and thus not only a lightning surge current but also an abnormal current flows through the high frequency transmitting portion 3c.

Similarly to the second embodiment, the high frequency transmitting portion 3c is configured such that ends of the high frequency passing portion 3c are in contact with each of the input port portion 1a and the output port portion 1b to maintain electrical connection between the input port portion 1a and the output port portion 1b, but are not fixed (fused) at at least one of the input port portion 1a and the output port portion 1b (for example, by soldering, welding, or the like).

Next, the abnormal current melting portion 3d will be described.

The abnormal current melting portion 3d has a shape of a cylinder extending from the input port portion 1a to the output port portion 1b and has a skin effect with respect to a lightning surge current and an abnormal current. Thus, the ease of current flow (impedance) of the lightning surge current can be adjusted by changing the diameter of the cylinder.

In addition, the abnormal current melting portion 3d is fixed (fused) to both the input port portion 1a and the output port portion 1b (for example, by soldering, welding, or the like).

Impedance with respect to a lightning surge current and impedance with respect to an abnormal current are respectively adjusted to conform to the following Formula (2) and Formula (3) while the diameter of the cylinder is adjusted as a parameter. Thus, the lightning surge current and the abnormal current mostly flow through the high frequency transmitting portion 3c and the abnormal current melting portion 3d, respectively.

Impedance of the high frequency transmitting portion 3c<impedance of the abnormal current melting portion 3d (Formula 2)

(The current easily flows through the high frequency transmitting portion 3c)

Impedance of the high frequency transmitting portion 3c>impedance of the abnormal current melting portion 3d (Formula 3)

(The current easily flows through the abnormal current melting portion 3d)

Further, the abnormal current melting portion 3d may melt and break in a case where an abnormal current having more than a certain current value flows, as in a case for a fuse element used in a common fuse. Thus, similar effects to those of the melting mechanism portion 1d-2 described in the second embodiment can be achieved.

According to the fuse 3 with a frequency separation function of the present embodiment which is configured as described above, the impedance of the high frequency transmitting portion 3c and the impedance of the abnormal current melting portion 3d conform to Formula (2) and Formula (3), respectively, by using a skin effect, such that the abnormal current melting portion 3d melts and breaks when an abnormal current flows through the abnormal current melting portion 3d. In this case, the high frequency transmitting portion 3c is not fixed to at least one of the input port portion 1a and the output port portion 1b, and thus the input port portion 1a side and the output port portion 1b side are physically separated from each other similar to the second embodiment, thereby blocking an abnormal current.

In this manner, the fuse 3 with a frequency separation function according to the present embodiment can separate a path for a lightning surge current which is a high frequency current and a path for an abnormal current which is a low frequency current from each other. Thereby, an operation can be continued even when a lightning surge current occurs. Further, in a case where an abnormal current flows, the abnormal current melting portion 3d melts and breaks, and the input port portion 1a side and the output port portion 1b side are physically separated from each other. Accordingly, the high frequency transmitting portion 3c which is not fixed is separated from the input port portion 1a or from the output port portion 1b, and thus an abnormal current can be blocked.

Figure 4:
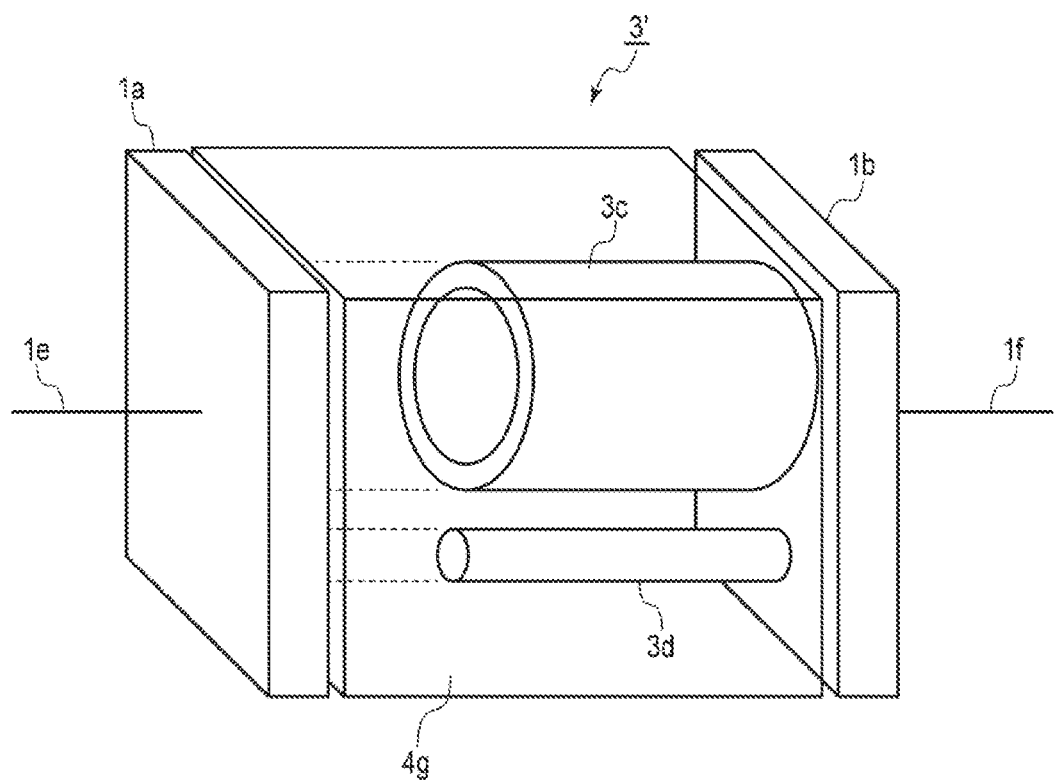
FIG. 4 is a perspective view illustrating a configuration example of a modification example of the fuse with a frequency separation function according to the third embodiment.

FIG. 4 is a perspective view illustrating a configuration example of a fuse 3' with a frequency separation function, which is a modification example of the fuse 3 with a frequency separation function according to the third embodiment.

The fuse 3' with a frequency separation function is configured such that a space between the high frequency transmitting portion 3c and the abnormal current melting portion 3d of the fuse 3 with a frequency separation function illustrated in FIGS. 3A and 3B is filled with another material such as a dielectric.

Filling a dielectric in the space between the high frequency transmitting portion 3c and the abnormal current melting portion 3d makes it possible to reduce the influence of an electromagnetic field generated by a current flowing through the high frequency transmitting portion 3c on the abnormal current melting portion 3d, and conversely, the influence of an electromagnetic field generated by a current flowing through the abnormal current melting portion 3d on the high frequency transmitting portion 3c and to adjust the degree of electrical separation between a lightning surge current and an abnormal current.

Fourth Embodiment

A fuse with a frequency separation function according to a fourth embodiment will be described.

The fourth embodiment is a modification example of the third embodiment.

As described in the third embodiment, in the fuse 3 with a frequency separation function, it is desirable to further increase the proportion of a lightning surge current flowing through the high frequency transmitting portion 3c and the proportion of an abnormal current flowing through the abnormal current melting portion 3d. In the third embodiment, in order to realize this, as illustrated in FIGS. 3A and 3B, the high frequency transmitting portion 3c has a shape of a cylindrical tube, and the abnormal current melting portion 3d has a shape of a cylinder.

However, as long as it is possible to further increase the proportion of a lightning surge current flowing through a high frequency transmitting portion and the proportion of an abnormal current flowing through an abnormal current melting portion, the shapes of the high frequency transmitting portion and the abnormal current melting portion are not limited to the shapes illustrated in FIGS. 3A and 3B and they can be realized in other shapes.

In the present embodiment, as illustrated in FIG. 5 to FIG. 8, a fuse with a frequency separation function in which a high frequency transmitting portion and an abnormal current melting portion are configured in various shapes will be described. Note that, also in FIG. 5 to FIG. 8, the same portions as those in FIG. 1 will be denoted by the same reference numerals and signs to avoid repeated description.

Figure 5:
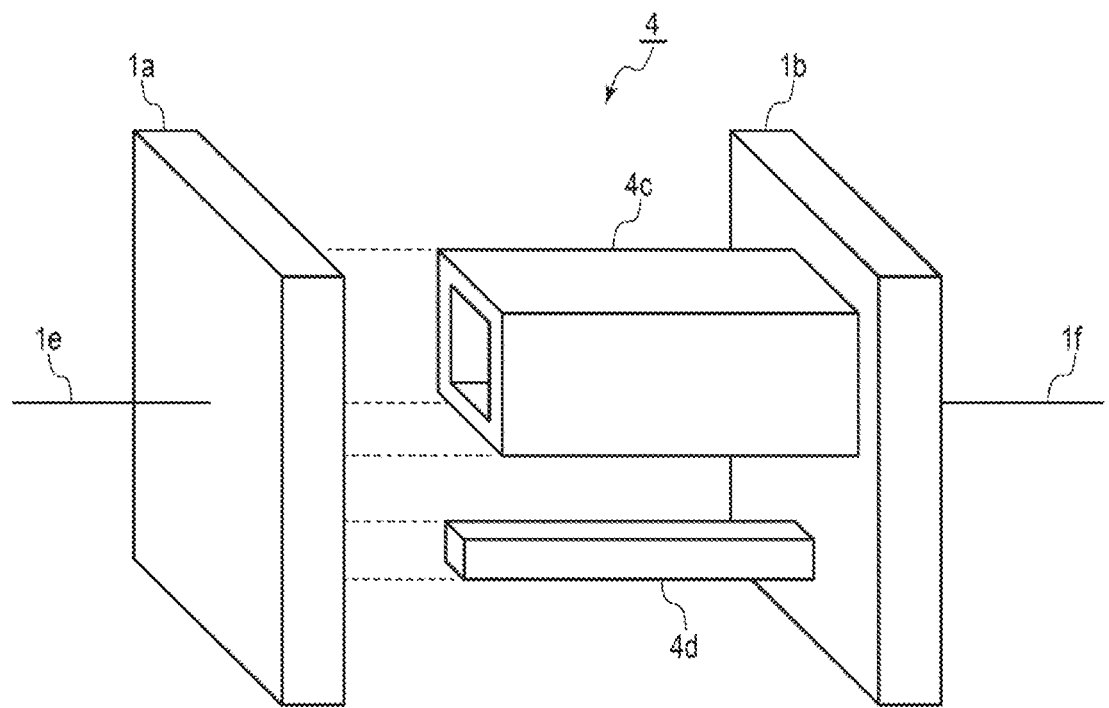
FIG. 5 is a perspective view illustrating a configuration example of a fuse with a frequency separation function according to a fourth embodiment.

A fuse 4 with a frequency separation function according to the fourth embodiment illustrated in FIG. 5 is configured such that the high frequency transmitting portion 3c having a shape of a cylindrical tube in the fuse 3 with a frequency separation function illustrated in FIGS. 3A and 3B is replaced with a high frequency transmitting portion 4c having a shape of a quadrangular tube and having the hollow center portion, and the abnormal current melting portion 3d having a shape of a cylinder in the fuse 3 with a frequency separation function is replaced with the abnormal current melting portion 4d having a shape of a quadrangular prism.

Note that the high frequency transmitting portion 4c having a shape of a quadrangular tube and having a hollow center portion and the abnormal current melting portion 4d having a shape of a quadrangular prism as illustrated in FIG. 5 may be replaced with a high frequency transmitting portion having a shape of a triangular tube and having a hollow center portion and an abnormal current melting portion having a shape of a triangular prism not illustrated in the drawing.

Further, the high frequency transmitting portion 4c having a shape of a quadrangular tube and having a hollow center portion and the abnormal current melting portion 4d having a shape of a quadrangular prism as illustrated in FIG. 5 may be replaced with a high frequency transmitting portion having a shape of a polygonal tube of a pentagonal or higher and having a hollow center portion and an abnormal current melting portion having a shape of polygonal prism of a pentagonal or higher not illustrated in the drawing.

Figure 6:
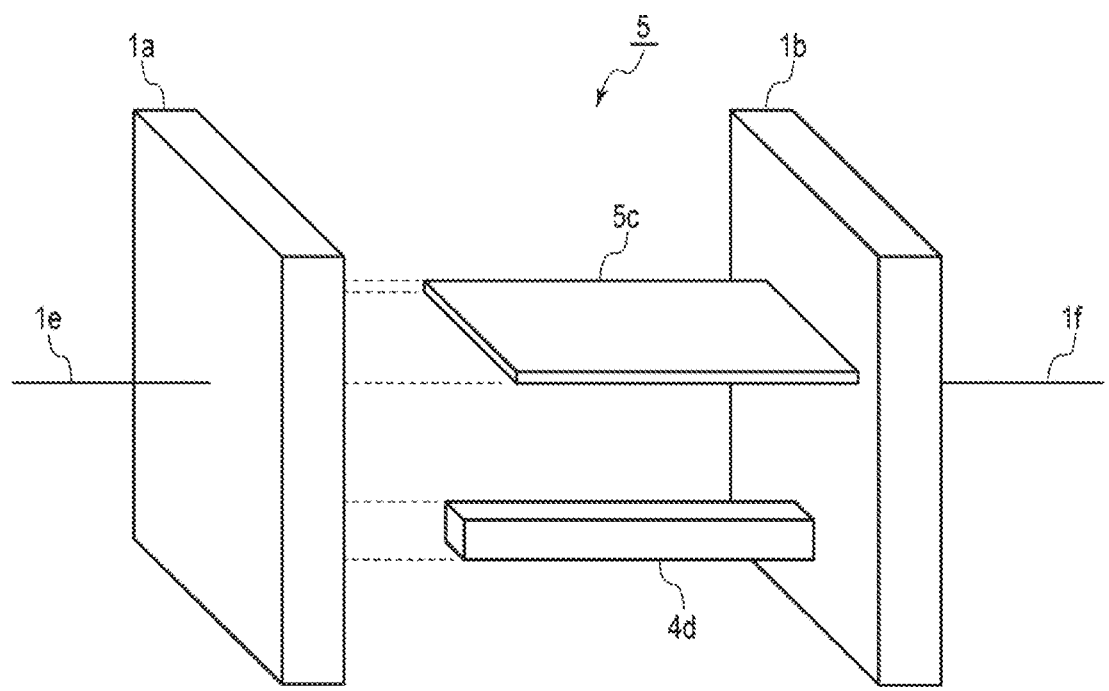
FIG. 6 is a perspective view illustrating another configuration example of the fuse with a frequency separation function according to the fourth embodiment.

Another fuse 5 with a frequency separation function according to the fourth embodiment illustrated in FIG. 6 is configured by replacing the high frequency transmitting portion 4c having a shape of a quadrangular tube of the fuse 4 with a frequency separation function illustrated in FIG. 5 with a high frequency transmitting portion 5c having a shape of a sheet. The thickness of the high frequency transmitting portion 5c having a shape of a sheet is the skin depth at which a frequency band of a lightning surge current can sufficiently pass.

Figure 7:
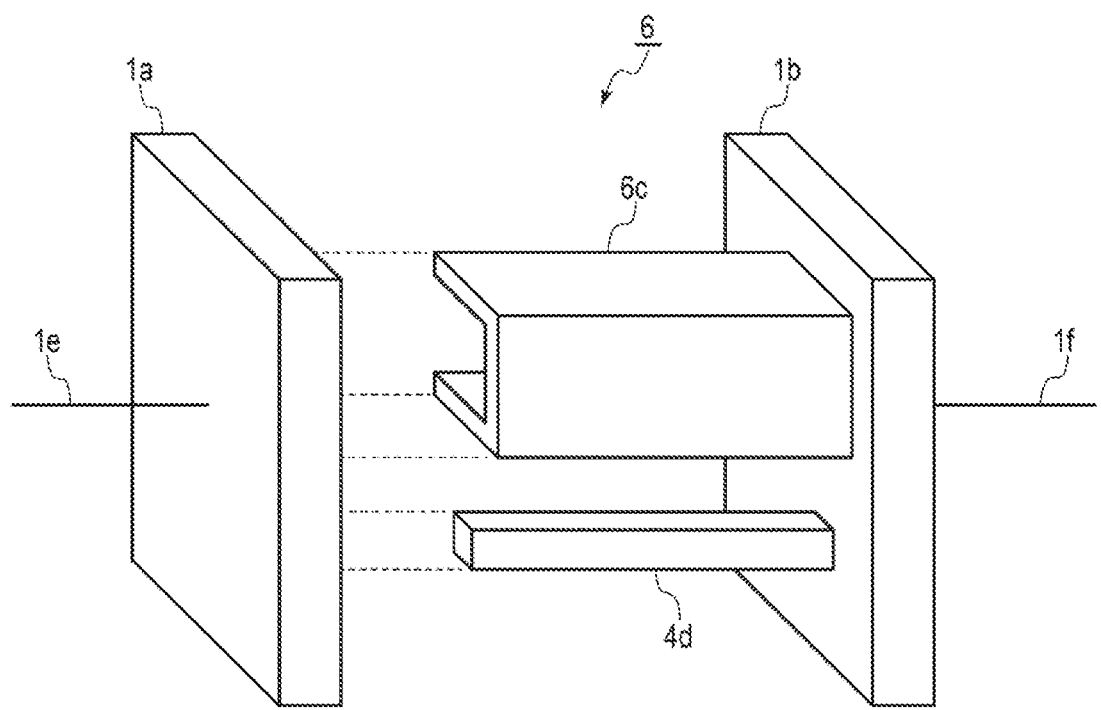
FIG. 7 is a perspective view illustrating still another configuration example of the fuse with a frequency separation function according to the fourth embodiment.

Still another fuse 6 with a frequency separation function according to the fourth embodiment illustrated in FIG. 7 is configured by replacing the high frequency transmitting portion 4c having a shape of a quadrangular tube of the fuse 4 with a frequency separation function illustrated in FIG. 5 with a high frequency transmitting portion 6c having a U shape obtained by omitting one side of the high frequency transmitting portion 4c having a shape of a quadrangular tube.

In addition, although not illustrated in the drawing, the high frequency transmitting portion 4c having a shape of a quadrangular tube of the fuse 4 with a frequency separation function illustrated in FIG. 5 may be replaced with a high frequency transmitting portion having a shape of a spiral.

Figure 8:
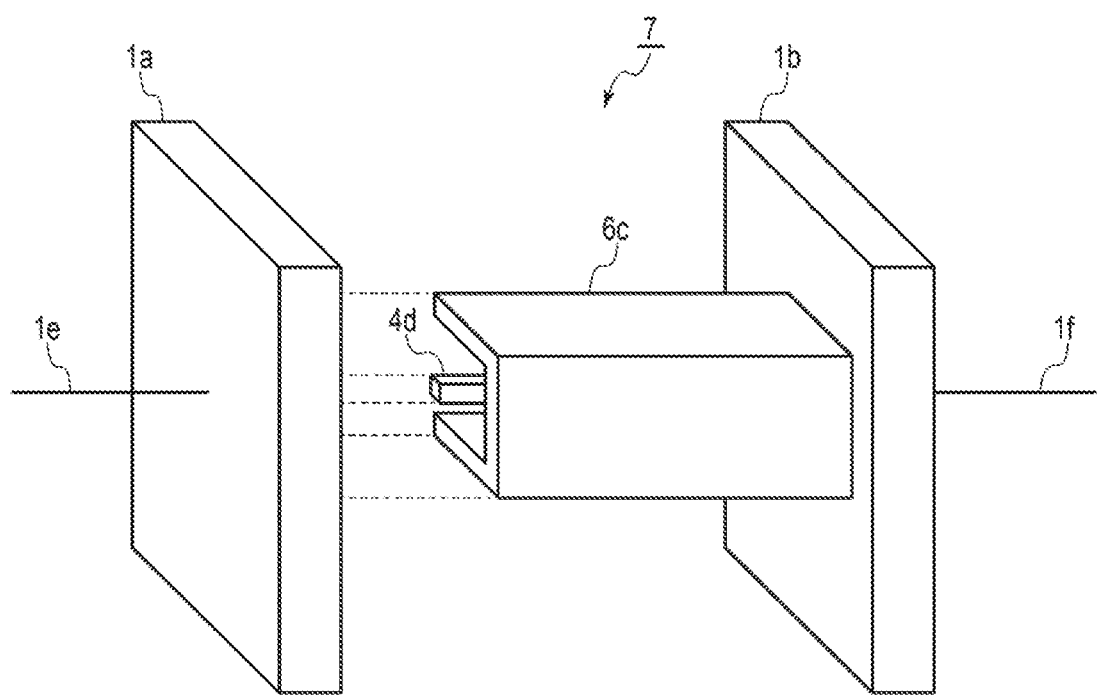
FIG. 8 is a perspective view illustrating still another configuration example of the fuse with a frequency separation function according to the fourth embodiment.

Further, in a case where the high frequency transmitting portion 6c having a U shape is applied, the abnormal current melting portion 4d may be disposed in a space inside the high frequency transmitting portion 6c having a U shape as illustrated in FIG. 8, instead of disposing the high frequency transmitting portion 6c having a U shape and the abnormal current melting portion 4d apart from each other in parallel as illustrated in FIG. 7.

Also in the fuses 4, 5, 6, and 7 with a frequency separation function according to the present embodiment which are configured as described above, a lightning surge current which is a high frequency current and an abnormal current which is a low frequency current can be separated from each other by the principle of a skin effect. Thereby, an operation can be continued even when a lightning surge current is generated. On the other hand, in a case where an abnormal current flows, the abnormal current melting portion 4d melts and breaks, and the input port portion 1a side and the output port portion 1b side are physically separated from each other, such that it is possible to block an abnormal current.

The present disclosure is not limited to the above-described embodiment as it is, and can be embodied with the components modified without departing from the scope of the disclosure when implemented. Furthermore, various inventions can be formed by appropriate combinations of a plurality of components disclosed in the above-described embodiment. For example, several components may be deleted from all of the components illustrated in the embodiment. Furthermore, components of different embodiments may be appropriately combined with each other.

REFERENCE SIGNS LIST 1, 2, 3, 3', 4, 5, 6, 7 Fuse with frequency separation function
1a Input port portion
1b Output port portion
1c, 3c, 4c, 5c, 6c High frequency transmitting portion
1d, 3d, 4d Abnormal current melting portion
1d-1 Low frequency transmitting portion
1d-2 Melting mechanism portion 1*e* Input lead
1*f* Output lead
1*h*, 1*i*, 1*j*, 1*k* Lead
4*g* Filler

The invention claimed is:

1. A fuse with a frequency separation function, the fuse comprising:
an input port portion which is an input terminal of a normal current that does not exceed a predetermined amount of current, an abnormal current that exceeds the predetermined amount of current, and a lightning surge current;
an output port portion which is an output terminal of the normal current, the abnormal current, and the lightning surge current;
a first transmitting portion provided between the input port portion and the output port portion, the first transmitting portion configured to transmit the lightning surge current entering the input port portion and guide the lightning surge current to the output port portion;
a second transmitting portion provided between the input port portion and the output port portion, the second transmitting portion configured to be capable of transmitting the normal current and the abnormal current that enter the input port portion; and
a melting mechanism portion provided between the input port portion and the second transmitting portion or between the second transmitting portion and the output port portion, the melting mechanism portion configured not to melt and break when the normal current passes, and configured to melt and break when the abnormal current passes,
wherein
the first transmitting portion is brought into contact with the input port portion and the output port portion,
the first transmitting portion is not fixed to at least one of the input port portion and the output port portion,
the second transmitting portion is fixed to any one of the input port portion and the output port portion, and
the melting mechanism portion is fixed to a port portion which is not fixed to the second transmitting portion, the port portion being either the input port portion or the output port portion.

2. A fuse with a frequency separation function, the fuse comprising:
an input port portion which is an input terminal of a normal current that does not exceed a predetermined amount of current, an abnormal current that exceeds the predetermined amount of current, and a lightning surge current;
an output port portion which is an output terminal of the normal current, the abnormal current, and the lightning surge current;
a first transmitting portion provided between the input port portion and the output port portion, the first transmitting portion configured to transmit the lightning surge current entering the input port portion and guide the lightning surge current to the output port portion; and
a melting mechanism portion provided between the input port portion and the output port portion, the melting mechanism portion configured to be capable of transmitting the normal current and the abnormal current that enter the input port portion, the melting mechanism portion configured not to melt and break when the normal current passes, and configured to melt and break when the abnormal current passes,
wherein
the first transmitting portion has a first shape extending from the input port portion to the output port portion and a thickness of the first shape is a skin depth at which a frequency band of the lightning surge current sufficiently passes,
the melting mechanism portion has a second shape extending from the input port portion to the output port portion, and
a dimension of the second shape is used as a parameter for adjusting impedance of the first transmitting portion and impedance of the melting mechanism portion such that the lightning surge current flows more through the first transmitting portion than the melting mechanism portion and the abnormal current flows more through the melting mechanism portion than the first transmitting portion.

3. The fuse with the frequency separation function according to claim 2, wherein a space between the first transmitting portion and the melting mechanism portion is filled with a dielectric.

4. The fuse with the frequency separation function according to claim 2, wherein
the first shape is quadrangular tube extending from the input port portion to the output port portion and a thickness of the quadrangular tube is the skin depth at which the frequency band of the lightning surge current sufficiently passes, and
the second shape is a quadrangular prism extending from the input port portion to the output port portion.

5. The fuse with the frequency separation function according to claim 2, wherein the second shape is a quadrangular tube with one side surface of the quadrangular tube omitted.

6. The fuse with the frequency separation function according to claim 2, wherein the first shape is a sheet extending from the input port portion to the output port portion, and a thickness of the sheet is the skin depth at which the frequency band of the lightning surge current sufficiently passes.

7. The fuse with the frequency separation function according to claim 2 wherein the second shape is a cylindrical tube.

* * * * *